United States Patent
Gustafsson et al.

(10) Patent No.: US 10,235,023 B2
(45) Date of Patent: Mar. 19, 2019

(54) METHOD FOR TEXT INPUT, APPARATUS, AND COMPUTER PROGRAM

(75) Inventors: Harald Gustafsson, Lund (SE); Song Yuan, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1200 days.

(21) Appl. No.: 13/809,602

(22) PCT Filed: Jul. 18, 2011

(86) PCT No.: PCT/EP2011/062199
§ 371 (c)(1),
(2), (4) Date: Feb. 5, 2013

(87) PCT Pub. No.: WO2012/010535
PCT Pub. Date: Jan. 26, 2012

(65) Prior Publication Data
US 2013/0227428 A1    Aug. 29, 2013

Related U.S. Application Data

(60) Provisional application No. 61/371,301, filed on Aug. 6, 2010.

(30) Foreign Application Priority Data

Jul. 19, 2010 (EP) .................... 10170013

(51) Int. Cl.
*G06F 3/0481* (2013.01)
*G06F 3/0484* (2013.01)
*G06F 3/0486* (2013.01)

(52) U.S. Cl.
CPC ........ *G06F 3/04842* (2013.01); *G06F 3/0481* (2013.01); *G06F 3/0486* (2013.01); *G06F 3/04845* (2013.01)

(58) Field of Classification Search
CPC ... G06F 3/0481; G06F 3/0484; G06F 3/04842
(Continued)

(56) References Cited

U.S. PATENT DOCUMENTS 5,208,910 A   5/1993 Higgins et al.
5,805,167 A   9/1998 van Cruyningen
(Continued)

FOREIGN PATENT DOCUMENTS

CN    101473295 A   7/2009
JP    2005018222 A   1/2005
(Continued)

OTHER PUBLICATIONS

Schell, D. J.; Drag and Drop Available Target Indicator; Research Disclosure vol. No. 341, No. 44; Sep. 1, 1992; DA892-0036 JHB; Kenneth Mason Publications Ltd., England; [Retrieved on Jan. 8, 2013]. Retrieved from the Internet: http://ip.com/pdf/ipcompad/IPCOM000109933D.pdf.

*Primary Examiner* — Justin S Lee
(74) *Attorney, Agent, or Firm* — Coats & Bennett, PLLC

(57) ABSTRACT

A method for a graphical user interface of an electronic device is disclosed. The graphical user interface has a plurality of selectable items for input to the electronic device. The method comprises receiving (100) a first user input related to the graphical user interface causing a first selection (102) of a first item and a first action involving the selected item; invalidating (105) the first action and setting (108) the first item or the first action as non-selectable; receiving (110) a further user input related to the graphical user interface; determining (112) a second selection of an item and an action involving the selected item excluding non-selectable items and actions; and executing (114) the action related to the second selection. An apparatus (200) comprising a graphical user interface (201) with an input device (202) and a display (203) arranged to view a plurality (Continued)

of selectable input items is also disclosed, wherein a processor (204) is arranged to control the graphical user interface (201). A computer program is also disclosed.

21 Claims, 2 Drawing Sheets

(58) Field of Classification Search
USPC .............................. 715/750, 710, 711, 733
See application file for complete search history.

(56) References Cited

U.S. PATENT DOCUMENTS

| | | | |
|---|---|---|---|
| 7,020,842 | B1 | 3/2006 | DeStefano et al. |
| 7,716,596 | B2 | 5/2010 | Cao et al. |
| 8,140,971 | B2 * | 3/2012 | Branson ............... G06F 9/4446 715/705 |
| 2003/0001895 | A1 | 1/2003 | Celik |
| 2005/0206730 | A1 | 9/2005 | Hagiwara |
| 2006/0010397 | A1 | 1/2006 | Laffey |
| 2007/0074286 | A1 | 3/2007 | Wendling |
| 2008/0007434 | A1 | 1/2008 | Hristov |
| 2008/0109747 | A1 | 5/2008 | Cao et al. |
| 2009/0125850 | A1 | 5/2009 | Karstens |
| 2010/0083109 | A1 | 4/2010 | Tse et al. |

FOREIGN PATENT DOCUMENTS

| | | | |
|---|---|---|---|
| JP | 2009163346 | A | 7/2009 |
| WO | 0038041 | A1 | 6/2000 |

* cited by examiner

METHOD FOR TEXT INPUT, APPARATUS, AND COMPUTER PROGRAM

TECHNICAL FIELD

The present invention generally relates to an approach for user input. In particular, the invention relates to a method for user input by using a graphical user interface, to an apparatus comprising an input device and such a graphical user interface, and to a computer program for implementing such user input.

BACKGROUND

User input on graphical user interfaces may be imprecise, especially when considering small apparatuses, such as portable apparatuses. Different approaches have been presented for being an aid to the user for making user input. However, either the user input is not easy or precise enough, or the apparatus will be too rigid in its aid to the user since an apparatus never can predict all intentions of a user. Thus, there is a need for improving user interaction with the graphical user interface.

SUMMARY

An object of the invention is to at least alleviate the above stated problem. The present invention is based on the understanding that user intervention and/or interpretation of user interaction in determination of the intended selected item can enhance user input.

According to a first aspect, there is provided a method for a graphical user interface of an electronic device, the graphical user interface having a plurality of items for input to the electronic device. The method comprises receiving a first user input related to the graphical user interface causing a first selection of a first item and a first action involving the selected item; invalidating the first action and setting the first item or the first action as non-selectable; receiving a further user input related to the graphical user interface; determining a second selection of an item and an action involving the selected item excluding non-selectable items and actions; and executing the action related to the second selection.

The selectable items may comprise any of a link, application, contact, button, input field, checkbox, icon, text area, text selection, drop element, and file shortcut.

The method may further comprise resetting the first item and/or the first action as selectable after a reset time period.

The invalidation of the first action may be responsive to any of receiving a cancel input from the user, receiving a cancel input from the user within a further cancel time period, receiving a new user input, receiving a new user input within a still further time period, and detecting a system invalidated action responsive to the first action. The detection of a system invalidated action may comprise determining a non-valid drag-and-drop action.

The respective time periods may be any of a pre-programmed time, a user settable time, or a time determined by the electronic device based on swiftness measured in previous user behaviour when interacting with the graphical user interface.

An advantage of an embodiment is that a user is helped to avoid non-desired actions upon re-trying to make user interaction. An advantage of an embodiment is that a user is still able to handle a dense graphical user interface. An advantage of an embodiment is that interaction with the graphical user interface becomes more intuitive and interactive for a user. An advantage of an embodiment is that the graphical user interface becomes more responsive to a user's interaction. An advantage of an embodiment is that the graphical user interface helps the user not to repeat actions prohibited by the system. An advantage of an embodiment is that suitable timing for improved help to the user is provided by the graphical user interface.

According to a second aspect, there is provided an apparatus comprising a graphical user interface with an input device and a display arranged to view a plurality of selectable items. The apparatus further comprises a processor arranged to control the graphical user interface. The input device is arranged to receive a first user input related to the graphical user interface causing a first selection of a first item and a first action involving the selected item. The processor is arranged to invalidate the first action and setting the first item or the first action as non-selectable. The input device is arranged to receive a further user input related to the graphical user interface. The processor is arranged to determine a second selection of an item and an action involving the selected item excluding non-selectable items and actions. The apparatus is arranged to execute the action related to the second selection.

The apparatus may further comprise a timer arranged to determine a reset time period, wherein the processor may be arranged to reset the first item and/or the first action after the reset time period.

The invalidation of the first action may be responsive to any of reception of a cancel input from the user via the input device, reception of a cancel input from the user via the input device within a further cancel time period, reception of a new user input through the graphical user interface, reception of a new user input through the graphical user interface within a still further time period, and detection of a system invalidated action responsive to the first action. The detection of a system invalidated action may comprise determining a non-valid drag-and-drop action.

The respective time periods may be any of a pre-programmed time, a user settable time, or a time determined by the apparatus based on swiftness measured in previous user behaviour when interacting with the graphical user interface.

The selectable items may comprise any of a link, application, contact, button, input field, checkbox, icon, text area, text selection, drop element and file shortcut.

According to a third aspect, there is provided a computer program comprising computer executable program code, the program code comprising instructions arranged to cause a processor to perform the method according to the first aspect.

Advantages of the second and third aspects are similar to those demonstrated for the first aspect. Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better under

DETAILED DESCRIPTION OF PREFERRED EMBODIMENTS

Figure 1:
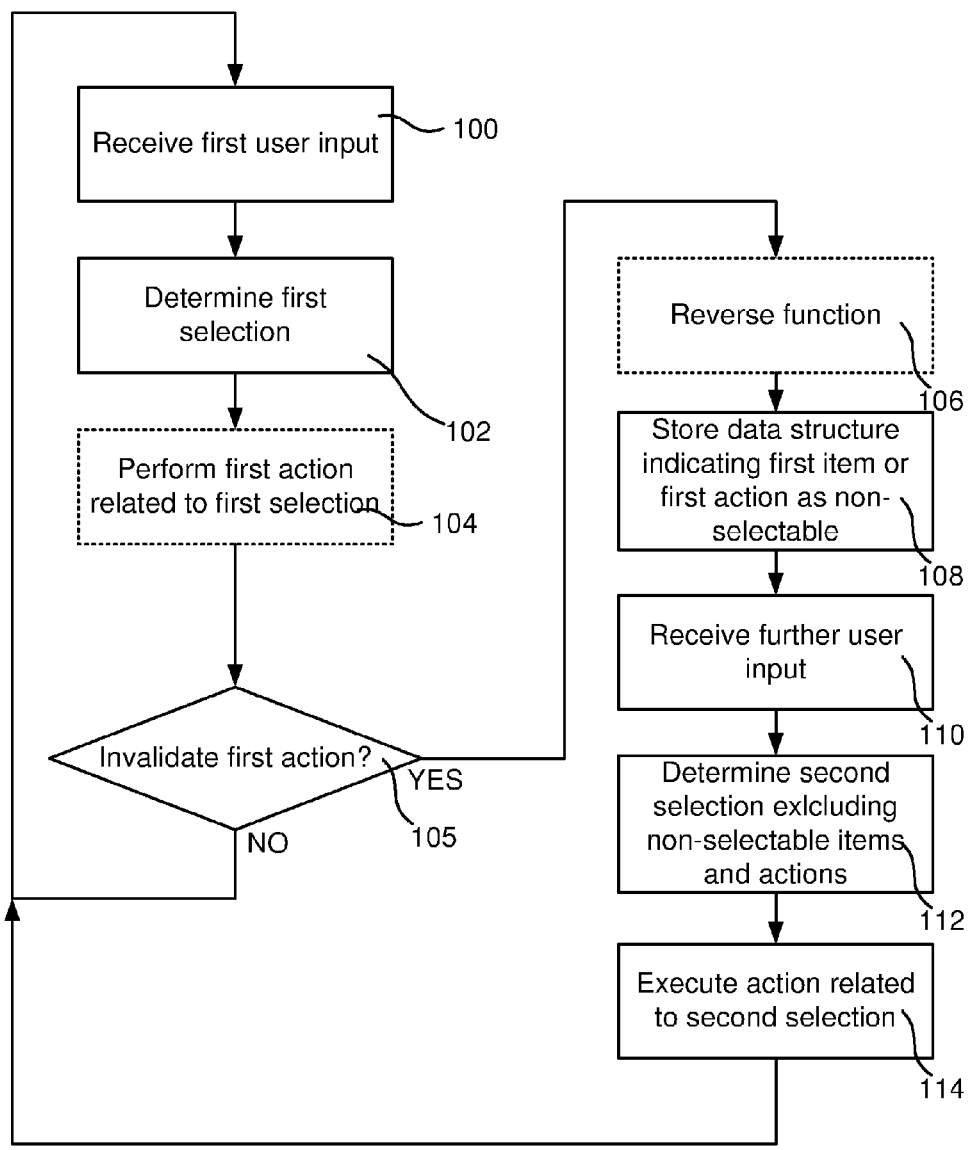
- FIG. 1 is a flow chart illustrating a method according to an embodiment.

FIG. 1 is a flow chart illustrating a method according to an embodiment. In a first user input reception step 100, a user input is received. The user input is received through a graphical user interface. A graphical user interface, many times just called by its acronym GUI, is an interaction user interface where a user is able to interact with graphically presented information by manipulating the graphical presentation. The graphical user interface thus comprises both input and output means, although the majority of the "graphical" nature is about the output. The manipulation can for example be made by using a touch sensitive display or some kind of pointer controlled by an input device, e.g. a joystick, a touch pad, a navigation key, or a trackball. The graphical presentation can be achieved by a display which shows a plurality of selectable items being associated with for example links, applications, contacts, file shortcuts, virtual buttons, input fields, checkboxes, icons, text areas, etc.

An item of the graphical user interface in this context can be a pictogram, icon, or piece of text being associated with an action or piece of content. The association to its action or content can be by a program or operating system of the apparatus in question having the graphical user interface.

An user input is generated upon an input item is selected and/or actuated by manipulating the user input device. The received user input can be invoking an application or functionality of an application, or be an administrative action controlled by the operating system, e.g. a drag-and-drop operation, which corresponds to an action comprising a sequence of sub-actions on an item that has been selected, i.e. the sequence adds up as the user continues to do the action, e.g. select, move, and drop.

For the understanding of the benefits of the here described features, a few use cases will be described here.

The contact area of a finger on a touch screen is sometimes too big to control the element on the screen easily and precisely, especially on a mobile phone as the resolution of its screen can be very high while the screen size is relatively small. In other words, the amount of information presentable per area can be large. For example upon web browsing on such a mobile phone for example, where the user intends to click a specific link in the web page, the user may very likely click a nearby area of the link and the system may get confused to judge what action the use intends with the click. Even though the user tries again, it might still be the case that the user makes the same mistakes again. It can be annoying for the users' mobile browsing experience.

A similar example, but with use of a pointer to be navigated on the screen by an input device, for example a joystick, and the user is on the move, e.g. walking or standing on a crowded train, it may be cumbersome to exactly hit items using the input device. Also here the user may very likely click a nearby area of the item and the system may get confused to judge what action the use intends with the click. Of course is it as hard to hit when the user tries again.

Another example is where a check box or other similar selectable item is selected as a first input, and thus marked, checked or otherwise toggled in state, thereafter selected as a invalidate input, i.e. unmarked, unchecked or otherwise toggled in state. An example is a user intends to uncheck a first checked box, but happens to click a nearby second check box, which then becomes checked. The user discovers the mistake and clicks the second check box again to uncheck it, i.e. performs an invalidate input. When the user clicks this area once more, the first check box will be unchecked since toggling of the second check box is temporarily deactivated and the input will be associated with the first check box. This can also be applicable to for example drop-down lists.

Another example is a drag-and-drop operation. A first item is moved to a first area. This drag-and-drop operation is not a valid operation for the apparatus, and the first item is deactivated for trying to make the same drag-and-drop operation. Instead, either another item will be the object of the drag-and-drop operation if the same input is received again, or the drag-and-drop operation is made with the first item but to another area which is a valid operation. A similar deactivation can be provided when the drag-and-drop operation is made from a first position and ends in the same position. This will be interpreted as the user did not want to move that item, which then will be deactivated for drag-and-drop, e.g. for a predetermined time.

These examples can be accomplished by the features described below.

As the circumstances of size of a convenient apparatus and a human's fingers are as they are, and also the nature of use of a portable electronic device, there has to be another approach for improving the users' experience of use. The here disclosed invention alleviates the problem by at least not letting the user make same mistake over and over again.

Thus, in the process, after reception 100 of a first user input, a selection is determined 102, e.g. which item that was selected, and also, if applicable, an action for the item. The item can be selected such that a position or area of the determined item is the closest to the position of the user actuation. A first action associated with or involving the item is then performed 104. These steps 100, 102, 104 can be considered normal procedure for a graphical user interface. However, if the first action is invalidated 105 for some reason, i.e. either by the user, where the user is giving a "cancel" input or giving a new input that indicates that the first input is no longer valid, or by the apparatus, where the apparatus finds the action non-executable. The first action can, when needed, be reversed 106, or just be stopped, and data about the item related to the invalidated action can be stored 108 in a data structure, which is made available to the process to indicate that the item is a deactivated item. In the data structure, the first item or the first action is set as non-selectable. A further user input is received 110. Upon determining 112 a second selection, e.g. which item among the selectable items that is related to the further user input, the first item or the first action stored in the data structure is now non-selectable, and another selection is made 112, and its corresponding action is performed or executed 114 by the apparatus.

Feedback can be provided to the user by for example indicating the deactivated action on the input device as inactive, e.g. the associated item being "greyed out" when presented to the user.

If the user gives several back, cancel, or return instructions, e.g. consecutively, the user's intention may be to enter a completely different state of the graphical user interface, and not to intervene with the determination of item. This can be detected by analysing input behaviour of back, cancel, or return commands and upon detection that it is probable that the user's intention is to enter a completely new state rather than intervention in determination, then no deactivation of items is caused, and the normal process can continue without any deactivations due to these commands.

Further, in FIG. 1 it is indicated that the invalidation and deactivation are performed after performing the first action. However, the invalidation and deactivation can equally be performed before finishing the first action 104, in which case the first action may never be performed completely. This is naturally the case where the first action is a non-executable action, but can also be the case where the user is fast enough to give a cancel input or a new input such that the first action did not yet complete.

The deactivation of the item can be timed out after a predetermined time, e.g. if no further user input associated with items is received during the predetermined time after the invalidation and deactivation. Thus, if the user regrets a back, cancel, or return action, it only takes a while, and the deactivation of the item is reset.

The process can include storing the deactivated first item, and possibly the position of the item in a temporary data structure. The process can then include accessing the temporary data structure upon determining the second item, and/or when displaying items. The temporary data structure is preferably discarded when the action related to the second item commences or is/has been performed. The discarding can be any of deleting the data structure or deleting contents, i.e. item(s) and position(s) of the data structure, or overwriting contents, deleting or overwriting references to data structures, etc.

Figure 2:
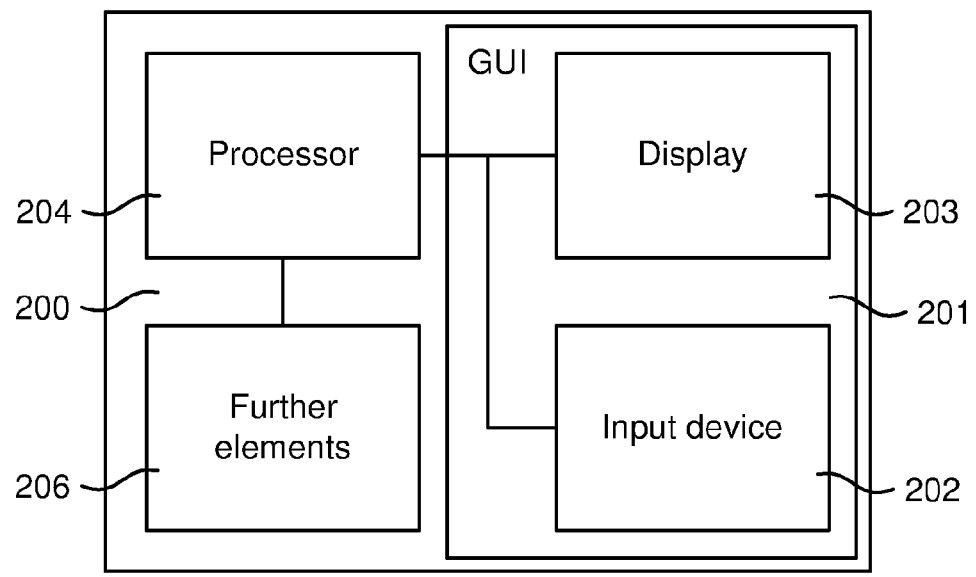
FIG. 2 schematically illustrates an apparatus according to an embodiment.

FIG. 2 schematically illustrates an apparatus 200 according to an embodiment. The apparatus 200 comprises graphical user interface 201 having a plurality of selectable input items being presented on a display 203 and an input device 202 through which the selectable items can be manipulated. The apparatus 200 further comprises a processor 204 which controls the graphical user interface. The apparatus 200 can also comprise further elements 206 such as memory, audio input and output, communications circuitry, optics, electrical interfaces, power supply, etc. The input device 202 and display 203 can form one element by being a touch sensitive display, but the input device 202 and display 203 may also be separate elements, as indicated above. Input to the apparatus 200 is arranged to be performed according to any of the embodiments above. The display 203 can be controlled by the processor 204 to display the selectable input items. For example, the input device 202 can be a touch sensitive surface on said display 203 and arranged to provide a position of touch action to the processor 204 upon user actuation by touch. Another example is that the input device 202 is a pointer control device controlling a pointer on said display 203 and arranged to provide a position of pointer action to the processor upon user actuation by the pointer control device. In these examples, the processor 204 can be arranged to receive the position and associate the input with an active one of the items being closest in position to the user actuation position.

In operation, the input device 202 is thus arranged to receive a first user input related to the graphical user interface 201 and related to a first item thereof related to a first action. The items, which are selectable, can be related to actions, and be any of a link, application, contact, button, input field, checkbox, icon, text area, and file shortcut. The processor 204 is arranged to, upon an invalidation, invalidate the first action and making the first item or the first action non-selectable. Here, an invalidation is for example any of reception of a cancel input from the user via the input device, reception of a new user input through the graphical user interface, and detection of a non-executable user input. The invalidation can also be any of receiving a cancel input from the user, e.g. within a further cancel time period, receiving a new user input, e.g. within a still further time period, and detecting a system invalidated action responsive to the first action. The input device 202 is also arranged to receive a further user input related to the graphical user interface 201, as demonstrated above. From this, the processor 204 is arranged to determine a second selection, e.g. which item among the plurality of selectable items and being an active item, i.e. not non-selectable, that is related to the further user input. The apparatus 200 can then execute an action related to the second selection. Thereby the apparatus 200 enables user interaction that will be experienced by the user to follow the intentions of the user in a more flexible way.

The apparatus 200 can further comprise a timer arranged to determine a time after the invalidation event such that the making non-selectable of the first item is timed out after a predetermined time. The timer can be implemented in the processor 204 or in the further elements 206.

The apparatus 200 can be a personal digital assistant or other portable computer benefitting from the improved user interaction, a mobile phone or smartphone, a mediaplayer device, a digital camera or other apparatus, preferably portable, having a graphical user interface.

Figure 3:
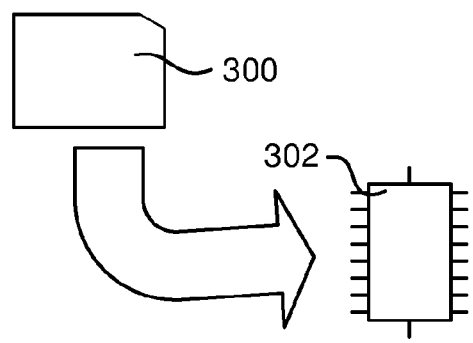
FIG. 3 schematically illustrates a computer program product and a processor arranged to execute a computer program of the computer program product.

FIG. 3 schematically illustrates a computer program product and a processor arranged to execute a computer program of the computer program product. The methods according to the embodiments demonstrated above are suitable for implementation with aid of processing means, such as computers and/or processors, especially for the case where the application is a communication apparatus such as a mobile phone or a so called "smartphone", i.e. a combined mobile telephone and portable computer or portable digital assistant, which apparatuses normally are arranged with non-negligible processing power and also with an operating system for handling one or more applications or computer programs. Therefore, there is provided computer programs, comprising instructions arranged to cause the processing means, processor, or computer to perform the steps of any of the methods according to any of the embodiments described with reference to FIG. 1. The computer programs preferably comprises program code which is stored on a computer readable medium 300, as illustrated in FIG. 3, which can be loaded and executed by a processing means, processor, or computer 302 to cause it to perform the methods, respectively, according to embodiments of the present invention, preferably as any of the embodiments described with reference to FIG. 1. The computer 302 and computer program product 300 can be arranged to execute the program code sequentially where actions of the any of the methods are performed stepwise. The processing means, processor, or computer 302 can be what normally is referred to as an embedded system. Thus, the depicted computer readable medium 300 and computer 302 in FIG. 3 should be construed to be for illustrative purposes only to provide understanding of the principle, and not to be construed as any direct illustration of the elements.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, implemented by an electronic device, for assisting a user of the electronic device, the method comprising:
providing a user with access to a plurality of electronic device functions via corresponding items displayed in a graphical user interface (GUI) on a physical display of the electronic device;
receiving, from the user, an invocation of an electronic device function via the corresponding item displayed within the GUI;
responsive to determining that the user did not intend the invocation of the electronic device function, automatically blocking access to the electronic device function via the corresponding item while the corresponding item remains displayed within the GUI, such that the electronic device function is unable to be accessed by the user via the corresponding item for a reset time period; and
responsive to the reset time period elapsing, unblocking access to the electronic device function via the corresponding item, such that the electronic device function is able to be accessed by the user via the corresponding item displayed within the GUI.

2. The method of claim 1, further comprising modifying the display of the corresponding item in the GUI to reflect that access to the electronic device function is blocked.

3. The method of claim 1, wherein the electronic device function comprises updating a value associated with the corresponding item and modifying the display of the corresponding item in the GUI to show the value.

4. The method of claim 1, wherein blocking access to the electronic device function via the corresponding item comprises redirecting user input directed at the corresponding item to a different item displayed in the GUI and executing the electronic device function corresponding to the different item.

5. The method of claim 1, wherein the items displayed in the GUI comprise one or more links, applications, contacts, buttons, input fields, checkboxes, icons, text areas, text selections, drop elements, or file shortcuts.

6. The method of claim 1, further comprising determining the reset time period based on swiftness of previous user interaction with the GUI.

7. The method of claim 1, wherein determining that the user did not intend the invocation of the electronic device function comprises detecting one or more of:
a cancellation of the electronic device function by the user;
a subsequent invocation of a different electronic device function via a different corresponding item; or
unsuccessful execution of the electronic device function.

8. The method of claim 7, wherein the unsuccessful execution of the electronic device function is a result of an invalid drag-and-drop input from the user.

9. The method of claim 7, wherein the detecting of either or both of the cancellation and subsequent invocation is within a threshold time allotted for the detecting.

10. The method of claim 9, further comprising determining the threshold time based on swiftness of previous user interaction with the GUI.

11. An apparatus comprising:
input circuitry configured to receive input from a user;
a physical display configured to output a graphical user interface (GUI) to the user;
processing circuitry communicatively coupled to the input and display devices and configured to:
provide a user with access to a plurality of electronic device functions via corresponding items displayed in the GUI on the physical display;
receive, from the user via the input circuitry, an invocation of an electronic device function via the corresponding item displayed within the GUI;
responsive to determining that the user did not intend the invocation of the electronic device function, automatically block access to the electronic device function via the corresponding item while the corresponding item remains displayed within the GUI, such that the electronic device function is unable to be accessed by the user via the corresponding item for a reset time period; and
responsive to the reset time period elapsing, unblock access to the electronic device function via the corresponding item, such that the electronic device function is able to be accessed by the user via the corresponding item displayed within the GUI.

12. The apparatus of claim 11, wherein the processing circuitry is further configured to modify the display of the corresponding item in the GUI to reflect that access to the electronic device function is blocked.

13. The apparatus of claim 11, wherein the electronic device function comprises updating a value associated with the corresponding item and modifying the display of the corresponding item in the GUI to show the value.

14. The apparatus of claim 11, wherein to block access to the electronic device function via the corresponding item, the processing circuitry is configured to redirect user input directed at the corresponding item to a different item displayed in the GUI and execute the electronic device function corresponding to the different item.

15. The apparatus of claim 11, wherein the items displayed in the GUI comprise one or more links, applications, contacts, buttons, input fields, checkboxes, icons, text areas, text selections, drop elements, or file shortcuts.

16. The apparatus of claim 11, wherein the processing circuitry is further configured to determine the reset time period based on swiftness of previous user interaction with the GUI.

17. The apparatus of claim 11, wherein to determine that the user did not intend the invocation of the electronic device function, the processing circuitry is configured to detect one or more of:
a cancellation of the electronic device function by the user;
a subsequent invocation of a different electronic device function via a different corresponding item; or
unsuccessful execution of the electronic device function.

18. The apparatus of claim 17, wherein the unsuccessful execution of the electronic device function is a result of an invalid drag-and-drop input from the user.

19. The apparatus of claim 17, wherein the processing circuitry is configured to detect either or both of the cancellation and subsequent invocation within a threshold time allotted for the detecting.

20. The apparatus of claim 19, wherein the processing circuitry is further configured to determine the threshold time based on swiftness of previous user interaction with the GUI.

21. A non-transitory computer readable medium storing a computer program product for controlling a programmable electronic device, the computer program product comprising software instructions that, when run on the programmable electronic device, cause the programmable electronic device to:
- provide a user with access to a plurality of electronic device functions via corresponding items displayed in a graphical user interface (GUI) on a physical display of the programmable electronic device;
- receive, from the user, an invocation of an electronic device function via the corresponding item displayed within the GUI;
- responsive to determining that the user did not intend the invocation of the electronic device function, automatically block access to the electronic device function via the corresponding item while the corresponding
- item remains displayed within the GUI, such that the electronic device function is unable to be accessed by the user via the corresponding item for a reset time period; and
- responsive to the reset time period elapsing, unblock access to the electronic device function via the corresponding item, such that the electronic device function is able to be accessed by the user via the corresponding item displayed within the GUI.

* * * * *